United States Patent [19]
Grayo

[11] Patent Number: 5,673,488
[45] Date of Patent: Oct. 7, 1997

[54] SAW FRAME

[75] Inventor: Lucien Roger Grayo, Annet, France

[73] Assignee: FACOM, Morangis Cedex, France

[21] Appl. No.: 537,826

[22] PCT Filed: Mar. 3, 1995

[86] PCT No.: PCT/FR95/00256

§ 371 Date: Jan. 5, 1996

§ 102(e) Date: Jan. 5, 1996

[87] PCT Pub. No.: WO95/23667

PCT Pub. Date: Sep. 8, 1995

[30] Foreign Application Priority Data

Mar. 3, 1994 [FR] France .................. 94 02476

[51] Int. Cl.$^6$ ........................ B27B 21/06
[52] U.S. Cl. ........................ 30/513; 30/507
[58] Field of Search ............. 30/507, 509, 513, 30/514, 517

[56] References Cited

U.S. PATENT DOCUMENTS

| | | |
|---|---|---|
| 103,700 | 5/1870 | Andrews ............ 30/507 |
| 1,806,702 | 5/1931 | O'Neill . |
| 1,949,196 | 2/1934 | Youlten et al. ............ 30/510 |
| 2,539,796 | 1/1951 | Shortell . |
| 3,821,974 | 7/1974 | Merrow ............ 30/513 |
| 3,822,731 | 7/1974 | Keymer . |
| 4,256,156 | 3/1981 | Biszantz et al. ............ 30/513 |
| 4,376,456 | 3/1983 | Jacoff . |

FOREIGN PATENT DOCUMENTS

| | | |
|---|---|---|
| 0 022 351 | 1/1981 | European Pat. Off. . |
| 20 16 309 | 10/1971 | Germany . |
| 191 105 | 1/1923 | United Kingdom . |
| 356 031 | 9/1931 | United Kingdom . |

*Primary Examiner*—Hwei-Siu Payer
*Attorney, Agent, or Firm*—Wenderoth, Lind & Ponack

[57] ABSTRACT

A saw frame having a bow shape has a blade carrier adapter at one end and a tensioner at the other end, between which a blade is tensioned in use. The tensioner is constructed for obtaining a predetermined tension in the blade independently of the manufacturing tolerances and in a substantial range of hole spacings of the blade.

13 Claims, 2 Drawing Sheets

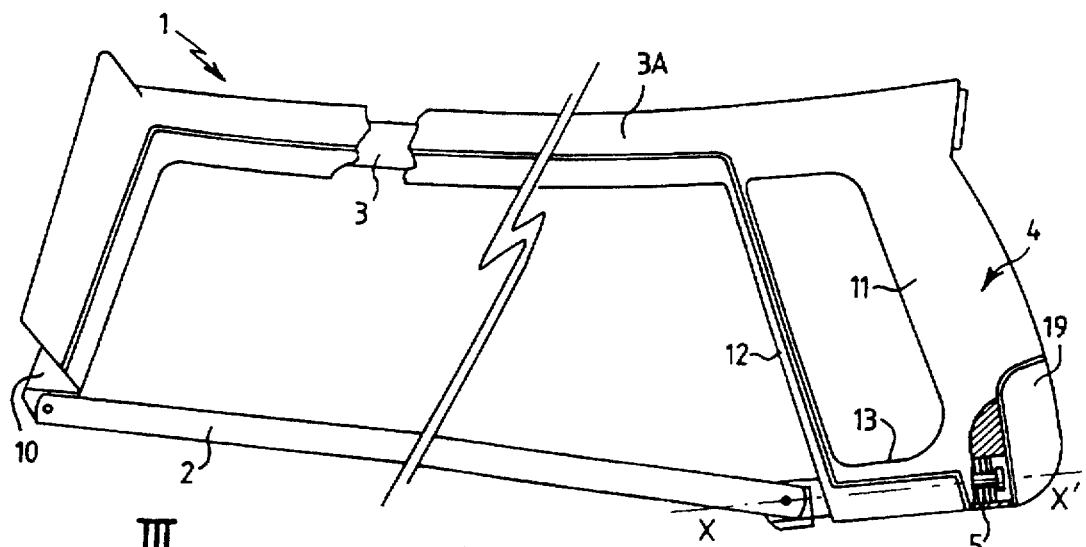
FIG. 1
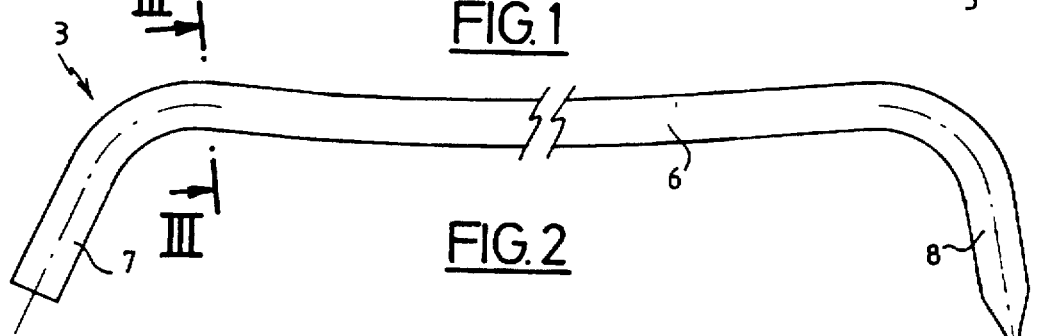
FIG. 2
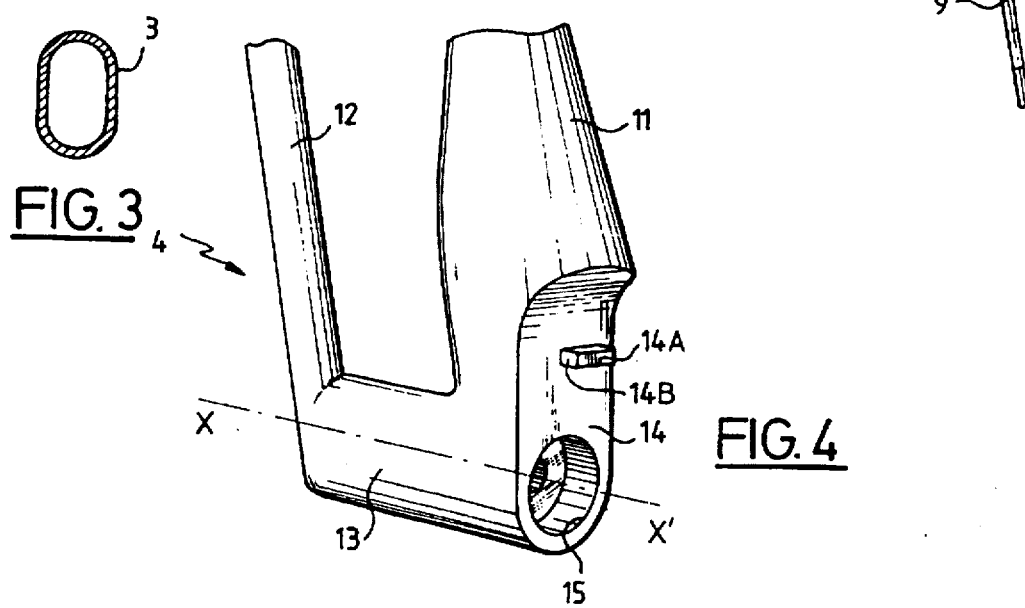
FIG. 3
FIG. 4

5,673,488

1

SAW FRAME

BACKGROUND OF THE INVENTION

The present invention relates to a saw frame of the type having a bow frame with a handle at one end, and a blade extending between opposing ends of the bow frame.

In known saw frames of this type, described for example in documents U.S. Pat. No. 2,539,796, EP-A-0,022,351, GB-A356,031 and GB-A-191,105, a calibrated spring makes it possible to know the tension in the blade, but the user can exceed the maximum intended tension by a very large amount, which may prove dangerous.

SUMMARY OF THE INVENTION

The object of the invention is to provide economical and reliable means allowing a precise predetermined tension to be exerted easily on the blade, guaranteeing that this tension is not exceeded.

To this end, the subject of the invention is a saw frame of the type comprising a bow integral with a rear handle, a front member for the attachment of the distal end of a blade, this member being provided at the front end of the frame, a rear member for the attachment of the proximal end of the blade, this member being provided at the rear end of the frame, the handle being provided with a mechanism for giving the blade a limited tension, which mechanism includes a screw-nut system acted upon by a rotatable operating member, a calibrated spring being interposed between the operating member and a reaction surface of the handle, characterized in that it comprises means for stopping the rotation of the rotatable operating member after the calibrated spring has been compressed over a predetermined length in order to obtain a predetermined tension in the blade, independently of the manufacturing tolerances, and in a substantial range of hole spacings of the blade.

The saw frame according to the invention may include one or more of the characteristics described below.

The calibrated spring comprises at least one elastic washer, for example a Belleville washer.

The means for stopping the rotation of the rotatable operating member include complementary stops borne respectively by the operating member and by the frame. The complementary stop means comprise two stops designed to immobilize the operating member in a recess of conjugate shape provided in the rear end of the frame.

The maximum travel required to crush the calibrated spring is greater than the pitch of the screw-nut system. The screw-nut system comprises a slide guided in translation in a bore formed in the rear part of the frame.

The bow has a counter-curvature with its concavity facing towards the outside with respect to the blade in an intermediate part of the frame. The bow is made as a single piece and includes a rear branch incorporated into the handle. The bow comprises a tubular metallic piece. The piece has, over at least part of its length, an elongate cross-section having its larger dimension in the mid-plane of the frame. The piece is embedded in a plastic material.

A blade is held tensioned between the front member and the rear member.

BRIEF DESCRIPTION OF THE DRAWINGS

One embodiment of the invention will now be described with regard to the appended drawings, in which:

FIG. 1 represents a handsaw according to the invention;

2

Figure 5:
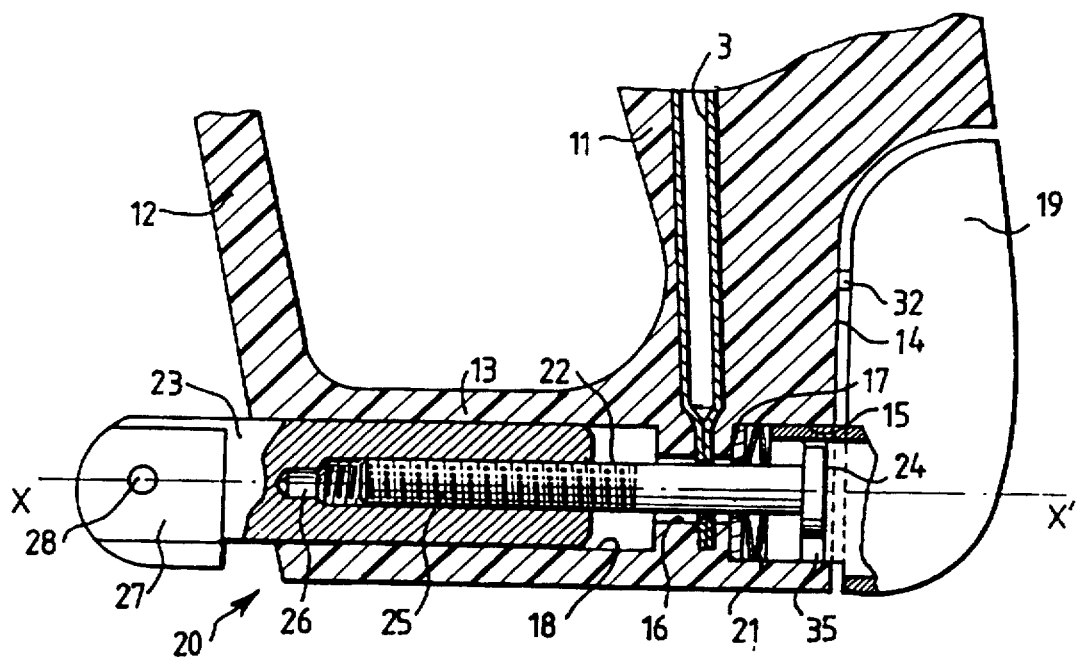
Figure 6:
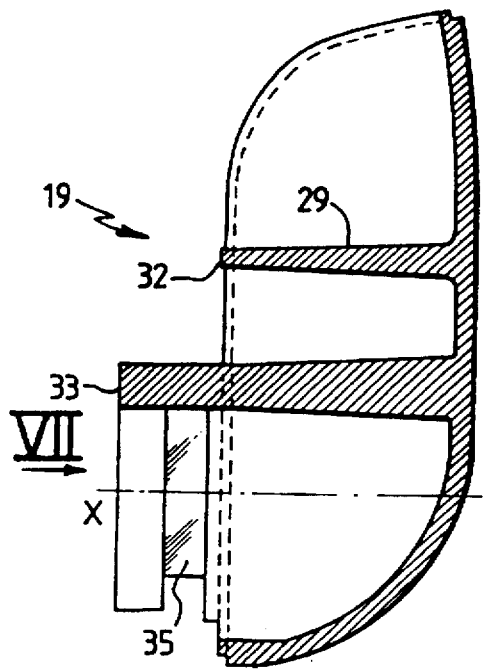
Figure 7:
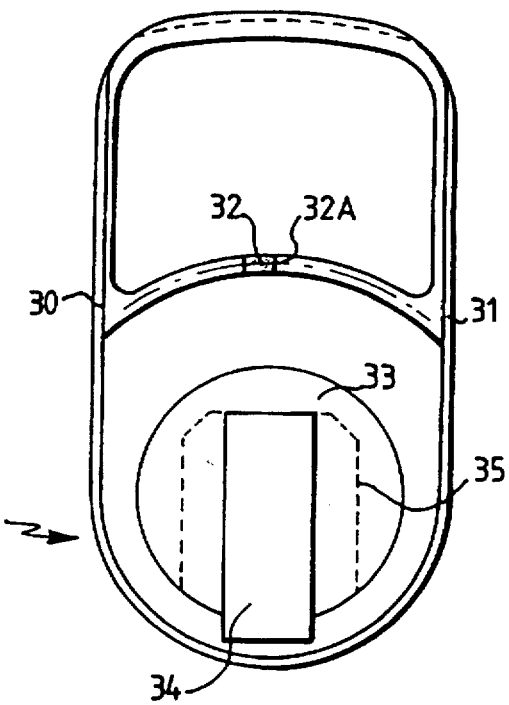

FIG. 2 is a side view of part of a bow of a frame of this saw;

FIG. 3 is a section on line III—III of FIG. 2;

FIG. 4 is a partial view in perspective of the handle of the saw frame;

FIG. 5 is a partial longitudinal section of a handle showing a tensioning mechanism, an operating member not being sectioned;

FIG. 6 is a longitudinal section through the operating member of the tensioning mechanism; and FIG. 7 is a side view of the operating member, in the direction of the arrow VII of FIG. 6.

DETAILED DESCRIPTION OF THE INVENTION

FIG. 1 shows a saw frame, denoted by the general reference 1, on which a blade 2 is mounted. This frame 1, which has the general shape of an inverted U with diverging branches, consists of a metal bow 3, the rear part of which is integral with a handle 4 which incorporates a tensioning mechanism 5. It will be assumed that the frame is orientated as represented, with the blade lowermost.

The bow 3 (FIGS. 2 and 3) is made from a hollow circular-section steel tube 6 and itself has the shape of an inverted U with diverging branches. This bow has a long length with respect to the length of its front branch 7 and rear branch 8. Over most of its length, on the web of the U, this bow 3 has a reverse curvature with the concavity facing upwards, visible in FIG. 2. In addition, as may be seen in FIG. 3, in the region of the two bends at least, the section of the bow is somewhat flattened laterally so as to have an oval shape with its major axis vertical. This increases the rigidity of the bow when the blade is tensioned.

The length of the branch 7 is approximately half that of the branch 8. On its lower half, the branch 8 is completely flattened in a plane perpendicular to the overall plane of the bow 3, so as to form a flat part 9 pierced with a hole. Fixed to the end of the branch 7 is a front blade carrier adaptor 10 made of "Zamak".

FIG. 1 shows that the bow 3 is coated in a sheath 3A of plastic, for example polyamide. This sheath matches the overall shape of the bow 3 and thus leaves the reverse curvature visible. The handle 4, of a shape designed to be easy for an operator to grip, is formed integrally with this sheath 3A.

It may be seen in FIGS. 1 and 4 that this handle 4 consists of three branches: two branches 11 and 12 which are substantially parallel, and a branch 13 joining the lower ends of the branches 11 and 12 together. The branch 11, easy for an operator to grip, incorporates the branch 8 of the bow 3. The branch 12, which is substantially flat, is forwards of the branch 11. These two branches have more or less the same inclination as the branch 8 of the bow. The branch 13, which is substantially cylindrical with an axis X–X' passing through the axis of the hole in the bow 3, is slightly inclined upwards and to the rear.

FIG. 4 also shows that the lower part of the branch 11 has a flat 14 contained in a plane perpendicular to the axis X–X'. This flat 14 is extended upwards by an overhanging concave rounded part. A stop block 14A, a stop face 14B of which is in the mid-plane of the frame 1, projects from the upper part of the flat 14.

It may be seen in FIGS. 4 and 5 that the branch 13 of the handle 4 has a bore passing through it along the axis X–X', this bore having three different diameters. The rear portion 15 of this bore, with circular section, extends from the flat 14 as far as a point close to the rear end of the bow.

The intermediate portion 16 of the bore, also of circular section, has a smaller diameter substantially equal to that of the hole in the bow and extends on either side of this hole. The reduction in diameter between the bores 15 and 16 defines a rear shoulder 17.

The third portion of the bore 18, of square section, extends forwards along the remainder of the length of the branch 13 and emerges on the front face of the branch 12.

FIG. 5 shows the tensioning device 5. This device consists of an operating member or cranking handle 19, of a screw-nut system 20 and of a calibrated spring 21.

The screw-nut system 20 is composed of a tensioning screw 22 and of a slide 23. The screw 22 has a square head 24 with straight faces and a shank 25 which is very long compared to its diameter, which is less than that of the portion of bore 16. The shank 25 is threaded only on its front half.

The slide 23 has the overall shape of a very elongate parallelepiped, of square section, which matches the section of the portion of bore 18. This slide includes a blind tapped axial bore 26 extending over most of its length, emerging at the rear end of the slide. The front end of the slide 23 has a domed shape and bears a lateral flat 27 from which a peg 28 projects. The domeshaped end of the slide 23 has a lower projection designed so that when the slide is inserted in the portion of bore 18, this projection comes flush with the lower plane of the branch 13 of the handle 4.

The calibrated spring 21 is composed of a flat washer and of two superimposed Belleville washers. These three washers have an outside diameter substantially equal to that of the portion of bore 15 and an inside diameter substantially equal to that of the shank 25 of the screw 22.

The cranking handle 19 is described with regard to FIGS. 5 to 7. This cranking handle has the shape of a shell which is open towards the front, with a thin wall, for example made of "Zamak". This shell has a shape which matches the hollowed-out lower part of the handle 4 so as to complete this handle when the cranking handle 19 is in place in this hollowed-out part.

The cranking handle 19 has an upper rib 29 in the shape of a circular arc (FIG. 7) extending from one edge to the other of the lateral sides 30 and 31 of the shell and ending in the plane of these edges. This rib 29 carries, projecting forwards, a stop 32 complementary to the peg (or stop black) 14A borne by the flat 14, and the stop face 32A of which is located in the mid-plane of the cranking handle.

The inner lower part of the shell forming the cranking handle 19 has a cylindrical boss 33, an axis X–X', whose diameter is equal to that of the portion of bore 15, and which extends from the bottom of the shell until it projects out of this shell.

A U-shaped slot 34, an axis X–X' and emerging on the lower part of the shell, extends along the entire length of this boss 33. The projecting part of the boss 33 moreover includes a rectangular notch 35 perpendicular to the axis X–X', emerging towards the bottom of the shell and which matches the head 24 of the screw 22.

The operation of this saw frame is explained with regard to FIGS. 1 and 5. The tensioning mechanism 5 is fitted into the handle 4 by firstly inserting the screw head 24 into the notch 35 of the cranking handle 19, then by slipping the two superimposed Belleville washers and the flat washer constituting the spring 21 over the screw, which washers come into abutment against the shoulder 17 when the shank 25 of the screw 22 is inserted into the portion of bore 18 of the handle 4, the cranking handle 19 being guided by its boss 33 in the rear portion is of the bore. The slide 23 is then inserted into the third portion 18 of the bore 18 and screwed onto the screw 22.

The saw blade 2 is fixed onto the pegs of the front blade holder 10 and of the slide 23. This blade is pulled taut to a predetermined tension, by turning the cranking handle 19 in the clockwise direction, as soon as the spring 21 is sandwiched between the shoulder 17 and the boss 33. The slide 23 advances in the portion 18, tensioning the saw blade until the tension exerted on the blade is equal to the spring force of the superimposed Belleville washers. The Belleville washers may, for example, be calibrated to 80 kg. The space between the shoulder 17 and the face opposite the boss 33 therefore decreases, and the stop faces 14A and 32A come into contact, preventing any additional rotation of the cranking handle 19 and thus limiting the tension exerted on the saw blade. The cranking handle therefore substantially fills the rear recess in the handle.

By using Belleville washers in which the travel required to crush them is markedly greater than the pitch of the screw 22, it can be guaranteed that this contact will be made when the predetermined tension corresponding to the calibration of these washers is obtained.

The shape of the bow 3 of the saw frame with reverse curvature increases the resistance to deformation of this frame when the blade is tensioned. It also contributes to obtaining a precise predetermined tension in the blade. Furthermore, this feature makes it possible to keep the overall appearance of the saw practically unchanged even for high blade tensions. The ovalized section illustrated in FIG. 3 also contributes to obtaining these very advantageous results.

By virtue of the adjustable length of the screw 22 engaged in the slide 23, the tensioning device 5 makes it possible to use saw blades which do not all have the same hole spacing, which makes it possible to use a varying range of saw blades.

I claim:

1. A saw frame comprising a bow integral with a rear handle, a front member for attachment of a distal end of a blade, said front member being provided at a front end of the frame, a rear member for the attachment of a proximal end of the blade, said rear member being provided at a rear end of the frame, the handle being provided with a mechanism for giving the blade a limited tension, which mechanism includes a screw-nut system acted upon by a rotatable operating member, a calibrated spring being interposed between the operating member and a reaction surface of the handle, and a means for stopping the rotation of the rotatable operating member after the calibrated spring has been compressed over a predetermined length in order to obtain a predetermined tension in the blade, independently of manufacturing tolerances, and in a substantial range of hole spacing of the blade, wherein the calibrated spring comprises at least one elastic washer.

2. A saw frame according to claim 1, wherein said at least one elastic washer comprises at least one Belleville washer.

3. A saw frame comprising a bow integral with a rear handle, a front member for attachment of a distal end of a blade, said front member being provided at a front end of the frame, a rear member for the attachment of a proximal end of the blade, said rear member being provided at a rear end of the frame, the handle being provided with a mechanism for giving the blade a limited tension, which mechanism includes a screw-nut system acted upon by a rotatable operating member, a calibrated spring being interposed between the operating member and a reaction surface of the handle, and a means for stopping the rotation of the rotatable operating member after the calibrated spring has been compressed over a predetermined length in order to obtain a predetermined tension in the blade, independently of manufacturing tolerances, and in a substantial range of hole spacing of the blade, wherein said calibrated spring is compressible from an expanded state to a compressed state, said operating member is movable along an axis to compress said calibrated spring from said expanded state to said compressed state, and a maximum travel of said operating member along said axis required to fully compress the calibrated spring is greater than a thread pitch of the screw-nut system, and wherein said predetermined length is greater than the thread pitch of the screw-nut system.

4. A saw frame for use with a blade having a distal hole and a proximal hole, said saw frame comprising:

a rear handle having a fixed reaction surface;

a bow having a rear portion and a front portion, said rear portion being fixed to said rear handle;

a blade distal hole-engaging member mounted to said front portion;

a tension adjusting mechanism mounted to said handle and including a threaded screw member and a nut member threadably engaged with said screw member for movement axially relative thereto;

a blade proximal hole-engaging member mounted to said tension adjusting mechanism;

an operating member rotatably mounted to said handle for rotation about an axis in a blade tensioning direction and a blade de-tensioning direction;

a resiliently compressible calibrated spring interposed between said operating member and said fixed reaction surface of said handle; and a stop member for preventing said operating member from rotating in said blade tensioning direction when said calibrated spring is compressed beyond a predetermined amount, such that the blade is prevented from being tensioned beyond a predetermined tension, whereby the predetermined tension in the blade is obtained independently of manufacturing tolerances.

5. A saw frame as recited in claim 4, wherein said stop member includes complementary abutment surfaces respectively provided on said operating member and said rear handle, one of said abutment surfaces facing in said blade tensioning direction and the other of said abutment surfaces facing in said blade de-tensioning direction.

6. A saw frame as recited in claim 4, wherein said handle has a recess formed therein, and said operating member is mounted in said recess of said handle; and said stop member is operable to stop rotation of said operating member when said operating member is in a predetermined mating position within said recess of said handle.

7. A saw frame as recited in claim 4, wherein said frame has a bore formed in a rear portion thereof; and said nut member of said tension adjusting mechanism comprises a slide member slidably mounted in said bore.

8. A saw frame as recited in claim 4, wherein said bow is formed with a mid-portion between said front portion and said rear portion, and said front portion and said rear portion extend away from said mid-portion in generally a first direction; and a portion of said mid-portion of said bow is formed with a curvature which is concave in a second direction opposite said first direction.

9. A saw frame as recited in claim 4, wherein said bow is formed as a single piece, and said rear portion of said bow is incorporated into said rear handle.

10. A saw frame as recited in claim 9, wherein said bow is embedded in a plastic material.

11. A saw frame as recited in claim 4, wherein said bow comprises a tubular metallic piece.

12. A saw frame as recited in claim 11, wherein said bow is formed with a mid-portion between said front portion and said rear portion, and said front portion and said rear portion extend away from said mid-portion in generally a first direction;

said mid-portion and said front portion and said rear portion of said bow are disposed in a given plane;

said bow has an elongate cross section over at least part of its length, said elongate cross section having a longer dimension and a shorter dimension; and said longer dimension is disposed in said given plane.

13. A hand saw comprising a saw frame as recited in claim 4 and a blade, wherein said blade is held tensioned between said front portion and said rear portion of said bow.

* * * * *